US010783796B2

(12) United States Patent
Mellinger, III et al.

(10) Patent No.: US 10,783,796 B2
(45) Date of Patent: Sep. 22, 2020

(54) COLLISION MANAGEMENT FOR A ROBOTIC VEHICLE

(71) Applicant: QUALCOMM Incorporated, San Diego, CA (US)

(72) Inventors: Daniel Warren Mellinger, III, Philadelphia, PA (US); Michael Joshua Shomin, Philadelphia, PA (US); Travis Van Schoyck, Lafayette Hill, PA (US); Ross Eric Kessler, Philadelphia, PA (US); John Anthony Dougherty, Philadelphia, PA (US); Jonathan Paul Davis, Philadelphia, PA (US); Michael Franco Taveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 15/693,833

(22) Filed: Sep. 1, 2017

(65) Prior Publication Data

US 2019/0073912 A1 Mar. 7, 2019

(51) Int. Cl.
*G08G 5/04* (2006.01)
*G06K 9/00* (2006.01)
*G08G 5/00* (2006.01)
*B64C 39/02* (2006.01)

(52) U.S. Cl.
CPC ............ *G08G 5/04* (2013.01); *G06K 9/0063* (2013.01); *G08G 5/0021* (2013.01); *G08G 5/0069* (2013.01); *G08G 5/045* (2013.01); *B64C 39/024* (2013.01); *B64C 2201/108* (2013.01); *B64C 2201/141* (2013.01); *G06K 2209/21* (2013.01)

(58) Field of Classification Search
CPC .... G08G 5/0021; G08G 5/0069; G08G 5/045; G08G 5/04; G06K 9/0063; G06K 2209/21; B64C 2201/141; B64C 2201/108; B64C 39/024
See application file for complete search history.

(56) References Cited

U.S. PATENT DOCUMENTS

| 8,473,189 | B2 | 6/2013 | Christoph |
| 9,613,539 | B1 | 4/2017 | Lindskog et al. |
| 9,778,662 | B2 * | 10/2017 | Tang ...................... G05D 1/101 |

(Continued)

FOREIGN PATENT DOCUMENTS

GB 2455374 A 6/2009

OTHER PUBLICATIONS

Barajas I., "Parrot Unveils New Drone and Controller", The Official Newegg Blog, May 14, 2014, Retrieved from internet on May 10, 2017, https://web.archive.org/web/20160523112041/https://blog.newegg.com/parrot-unveils-drone-controller-oculus-compatible/, pp. 1-6.

(Continued)

*Primary Examiner* — Mussa A Shaawat
(74) *Attorney, Agent, or Firm* — The Marbury Law Group, PLLC

(57) ABSTRACT

Embodiments include devices and methods operating a robotic vehicle. A robotic vehicle processor may detect an object posing an imminent risk of collision with the robotic vehicle. The robotic vehicle processor may determine a classification of the detected object. The robotic vehicle processor may manage a rotation of a rotor of the robotic vehicle prior to a collision based on the classification of the object.

37 Claims, 8 Drawing Sheets

(56) References Cited

U.S. PATENT DOCUMENTS

| | | | | |
|---|---|---|---|---|
| 9,954,992 | B2* | 4/2018 | Deng | H04M 1/72527 |
| 2002/0176605 | A1* | 11/2002 | Stafsudd | G06K 9/3241 |
| | | | | 382/106 |
| 2008/0243383 | A1* | 10/2008 | Lin | G01C 21/165 |
| | | | | 701/469 |
| 2014/0022051 | A1* | 1/2014 | Levien | G05D 1/0202 |
| | | | | 340/5.2 |
| 2015/0314881 | A1 | 11/2015 | Tsaliah et al. | |
| 2016/0039529 | A1 | 2/2016 | Buchmueller et al. | |
| 2016/0275801 | A1* | 9/2016 | Kopardekar | G08G 5/0043 |
| 2016/0363652 | A1 | 12/2016 | Hamminga et al. | |
| 2017/0069214 | A1* | 3/2017 | Dupray | G08G 5/0013 |
| 2017/0225680 | A1* | 8/2017 | Huang | B60T 7/22 |
| 2017/0261604 | A1* | 9/2017 | Van Voorst | G01S 7/51 |
| 2018/0029522 | A1* | 2/2018 | Gordon | B60Q 5/00 |
| 2018/0032040 | A1* | 2/2018 | Sweet, III | G05D 1/101 |
| 2018/0032042 | A1* | 2/2018 | Turpin | H04N 13/239 |
| 2018/0232415 | A1* | 8/2018 | Deng | G06F 16/2453 |
| 2018/0322646 | A1* | 11/2018 | Matthies | G06K 9/6226 |
| 2019/0012170 | A1* | 1/2019 | Qadeer | G06T 15/005 |
| 2019/0019423 | A1* | 1/2019 | Choi | G08G 5/04 |

OTHER PUBLICATIONS

International Search Report and Written Opinion—PCT/US2018/045117—ISA/EPO—dated Oct. 23, 2018.

\* cited by examiner

COLLISION MANAGEMENT FOR A ROBOTIC VEHICLE

BACKGROUND

Robotic vehicles are increasingly used for a wide range of applications, including rapid delivery of packages, medicine, or other supplies; remote sensing of storms and environmental conditions; 3-D mapping operations; inspection of farm crops or inaccessible equipment; photography for sporting events, journalism, law enforcement; monitoring of remote or migratory wildlife; search and rescue missions; and other purposes. A robotic vehicle may be provided a task or a mission, and autonomously or semi-autonomously execute one or more aspects of the task or mission.

Collision avoidance technology is a major area of research and development for robotic vehicles. The typical approach is to detect obstacles in the vicinity of the robotic vehicle using a sensor, and when an obstacle is detected automatically control the robotic vehicle to brake, initiate some maneuver to avoid the obstacle, or simply prevent the vehicle from moving towards the obstacle.

However, robotic vehicles have physical constraints and require a certain amount of space and time to execute any collision avoidance maneuver. Thus, some collisions are unavoidable. For example, the robotic vehicle may detect an obstacle too late to avoid it. As another example, a person, pet, etc. may suddenly enter the robotic vehicle's path rendering a collision unavoidable. As another example, environmental conditions (such as wind or weather) may unpredictably alter the UAV's movement. The spinning propellers of a robotic vehicle can do significant damage to a person, animal, or object (an "obstacle") in a collision. Managing unavoidable collisions may reduce damage to the person or obstacle as well as to the robotic vehicle.

SUMMARY

Various embodiments may be implemented in a processor of a robotic vehicle for minimizing injury or damage to people, animals, objects, and the robotic vehicle from unavoidable collisions. Various embodiments may include detecting an object posing an imminent risk of collision with the robotic vehicle, determining a classification of the detected object, and managing a rotation of a rotor of the robotic vehicle prior to a collision based on the classification of the object. In some embodiments, managing the rotation of the rotor of the robotic vehicle prior to the collision based on the classification of the object may include stopping the rotor prior to the collision.

In some embodiments, detecting the object posing an imminent risk of collision with the robotic vehicle may include determining one or more of a relative position, a relative motion, and a range of the detected object, and determining a probability of collision with the object based on the one or more of the relative position, the relative motion, and the range of the detected object. In some embodiments, determining the classification of the detected object may include identifying the object. Some embodiments may further include determining a consequence of a collision based on the classification of the identified object.

In some embodiments, managing the rotation of the rotor of the robotic vehicle prior to the collision based on the classification of the object may include determining whether to stop the rotor of the robotic vehicle prior to the collision based on the determined consequence of a collision. In some embodiments, managing the rotation of the rotor of the robotic vehicle prior to the collision based on the classification of the object may include determining whether to stop the rotor of the robotic vehicle prior to the collision based on the determined consequence of a collision and a determined probability of collision with the object.

In some embodiments, determining the classification of the detected object may include determining whether the identified object belongs to a first class of objects or a second class of objects, and managing the rotation of the rotor of the robotic vehicle prior to the collision based on the classification of the object may include stopping the rotor prior to the collision in response to determining that the identified object belongs to the first class of objects, and not stopping the rotor prior to the collision in response to determining that the identified object belongs to the second class of objects.

In some embodiments, the first class of objects may include a human being, and the second class of objects may include objects that are not human beings. In some embodiments, determining the classification of the detected object may include determining a relative motion of the object with respect to the robotic vehicle.

Some embodiments may further include determining flight parameters of the robotic vehicle, and managing the rotation of the rotor of the robotic vehicle prior to collision based on the classification of the object may include managing the rotation of the rotor based on the flight parameters of the robotic vehicle and the classification of the object. Some embodiments may further include determining a location of the robotic vehicle, and managing the rotation of the rotor of the robotic vehicle prior to collision based on the classification of the object may include managing the rotation of the rotor based on the location of the robotic vehicle and the classification of the object.

Some embodiments may further include determining a severity of an imminent collision, and managing the rotation of the rotor of the robotic vehicle prior to collision based on the classification of the object may include managing the rotation of the rotor based on the determined severity of the imminent collision. Some embodiments may further include determining whether to restart the rotor after the collision in response to determining that the rotor was stopped prior to the collision.

Some embodiments may further include identifying one or more objects in proximity to or approaching the robotic vehicle and one or more characteristics of the identified one or more objects, and classifying the one or more objects prior to detecting the object posing an imminent risk of collision with the robotic vehicle, and determining the classification of the detected object may include recalling a classification of the detected object accomplished prior to detecting the object posing the imminent risk of collision with the robotic vehicle.

Further embodiments may include a robotic vehicle including a rotor and a processor coupled to the rotor and configured with processor-executable instructions to perform operations of the methods summarized above. Further embodiments may include a robotic vehicle including means for performing functions of the methods summarized above. Further embodiments may include processor-readable storage media on which are stored processor executable instructions configured to cause a processor of robotic vehicle to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
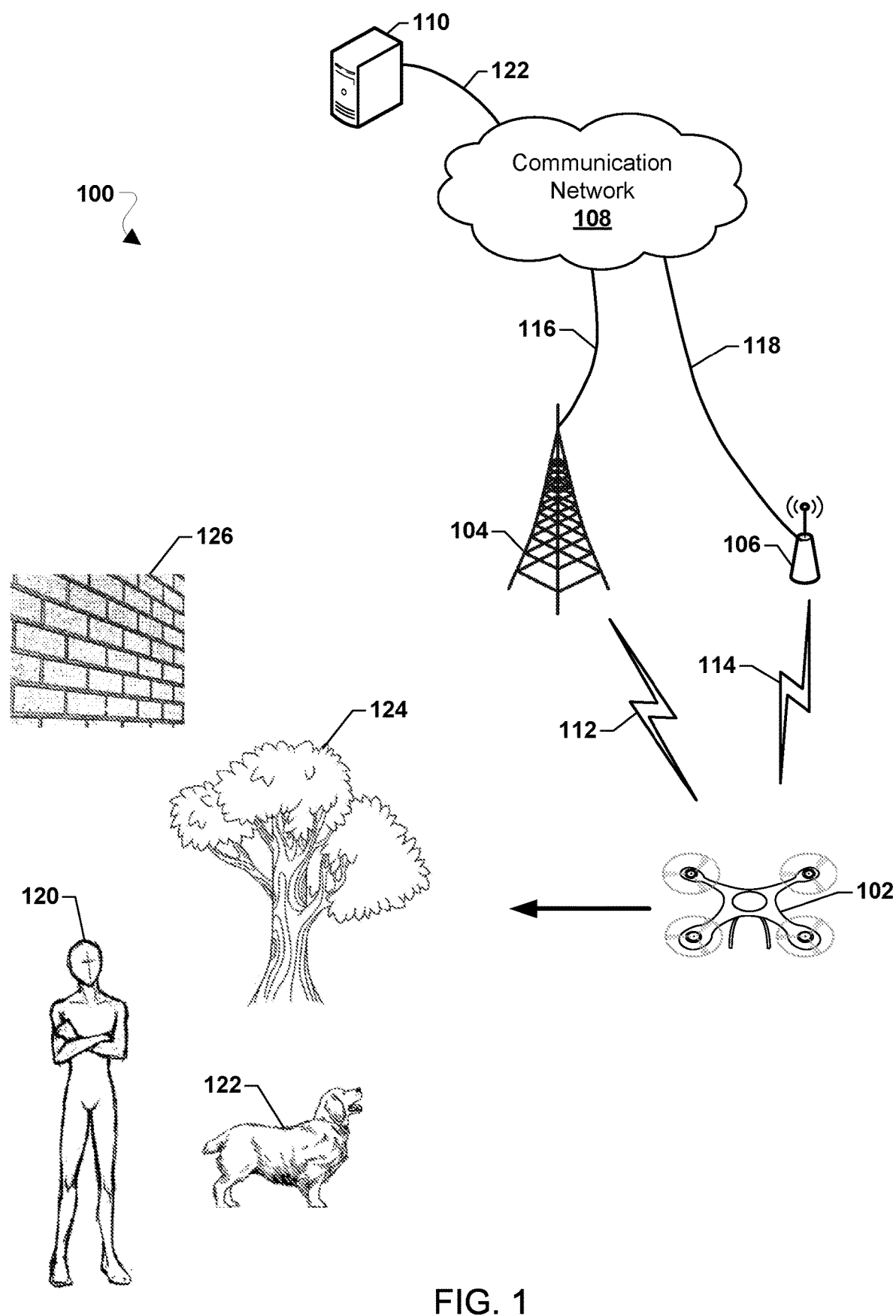
FIG. 1 is a system block diagram of a robotic vehicle operating within a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of a robotic vehicle for managing operations of the robotic vehicle when the robotic vehicle detects an imminent collision or a risk of an imminent collision. Various embodiments enable the robotic vehicle to rapidly identify or classify an object posing an imminent risk of collision with the robotic vehicle and to dynamically manage a rotation of one or more rotors of the robotic vehicle based on the identification or classification of the object. Various embodiments may also consider other factors, such as robotic vehicle flight parameters, robotic vehicle location, relative motion of the object with respect to the robotic vehicle, and a severity of the imminent collision, as well as the identification or classification of the object, to dynamically manage the rotation of the one or more rotors. Various embodiments enable the processor of the robotic vehicle to manage a rotation of one or more rotors of the robotic vehicle based on factors determined in real time by the robotic vehicle processor. Various embodiments improve the operation of the robotic vehicle by enabling the robotic vehicle processor to manage robotic vehicle operations, and in particular manage the rotation of one or more rotors of the robotic vehicle, using dynamic information determined by the processor of the robotic vehicle rather than, for example, static triggers for certain robotic vehicle behaviors. In some embodiments, the robotic vehicle may determine that the appropriate response is to sacrifice the robotic vehicle in favor of protecting the detected object based on various factors. In some embodiments, the robotic vehicle may determine that the potential damage caused by an imminent collision with the detected object may be sufficiently low that the robotic vehicle should maintain operations and not sacrifice the robotic vehicle. Various embodiments enable the robotic vehicle to perform a dynamic triage or real-time determination of the severity of an imminent collision, and weighing a variety of factors the robotic vehicle may manage operations, including rotation of one or more robotic vehicle rotors, to protect human or animal life, protect property, or protect the robotic vehicle, using dynamic factors.

As used herein, the term "robotic vehicle" refers to one of various types of propeller driven vehicles including an onboard computing device configured to provide some autonomous or semi-autonomous capabilities. Examples of robotic vehicles include but are not limited to: aerial vehicles, such as an unmanned aerial vehicle (UAV); propeller driven ground vehicles (e.g., an autonomous or semi-autonomous car, a vacuum robot, etc.); and water-based vehicles (i.e., vehicles configured for operation on the surface of the water or under water); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors. A robotic vehicle may include a variety of components and/or payloads that may perform a variety of functions. The term "components" when used with respect to a robotic vehicle includes robotic vehicle components and/or robotic vehicle payloads.

Although robotic vehicle sensors, processing power, and navigation capabilities are increasingly sophisticated, robotic vehicle collisions are inevitable and unavoidable. For example, the robotic vehicle may detect an obstacle too late to avoid it; a person, animal, or object may suddenly enter the robotic vehicle's flight path; or environmental conditions may unpredictably alter the robotic vehicle's movement. As another example, a robotic vehicle that is hovering may detect an approaching person, animal, or object. The spinning propellers of a robotic vehicle may cause significant damage to a person, animal, or object (an "obstacle") in a collision.

Various embodiments include methods and a processor of the robotic vehicle configured to implement the methods of operating a robotic vehicle to manage operations of the robotic vehicle when the robotic vehicle detects an imminent collision or a risk of an imminent collision with an object.

In various embodiments, the robotic vehicle may detect an object posing an imminent risk of collision with the robotic vehicle. In some embodiments, the robotic vehicle may determine a classification of the detected object. For example, the robotic vehicle may use information from one or more sensors of the robotic vehicle to rapidly determine a classification of the detected object. In some embodiments, the robotic vehicle may apply a machine learning model to determine a classification of the detected object. In some embodiments, the robotic vehicle may determine a specific identification of the object and may determine the classification based on the specific identification. In some embodiments, the robotic vehicle may assign the identified object to an object class. For example, a first class of objects may include human beings, and a second class of objects may include objects that are not human beings. As another example, a first class of objects may include objects for which the result or cost of damage may be considered high (e.g., objects that may be easily damaged by a rotor of the robotic vehicle, such as a human being, an animal, or certain types of property), and a second class of objects may include objects for which the result or cost of damage may be considered low (e.g., objects that may not be easily damaged by a rotor of the robotic vehicle, such as trees, buildings, walls, glass windows, and the like).

In various embodiments, the robotic vehicle may manage a rotation of one or more rotors of the robotic vehicle based on the classification of the object prior to the collision with the object. In some embodiments, based on the classification of the object the robotic vehicle may stop the rotation of the one or more rotors, to mitigate any damage that may be caused by spinning rotors to the object. In some embodiments, based on the classification of the object the robotic vehicle may not stop the rotation of the one or more rotors. For example, based on the classification, the robotic vehicle may determine that the consequences of potential damage to the object from spinning rotors is less than the potential damage to the robotic vehicle from stopping the rotors, either from the collision or after the collision (e.g., from an uncontrolled fall). Based on such determinations, the robotic vehicle may not stop the one or more rotors or not stop the rotors.

In some embodiments, the robotic vehicle may determine whether to stop one or more rotors of the robotic vehicle based on a probability of collision with a detected object and a determination of the consequences of damages cause by such a collision. In some embodiments, the robotic vehicle may determine a relative position of the object, a relative motion of the object, and/or a range to the object. The relative motion of the object may include a motion of the robotic vehicle and a motion of the object. The robotic vehicle may use information from one or more sensors of the robotic vehicle to determine the relative position, relative motion, and/or range of the object. Based on the relative position, relative motion, and/or range of the object, the robotic vehicle processor may determine a probability of collision between the robotic vehicle and the detected object. In some embodiments, the robotic vehicle may identify the object and estimate the potential for injury of a collision with a person or animal or a financial consequence of a collision with an inanimate object. In some embodiments, the robotic vehicle processor may estimate a combination of potential injury and financial damage to the object and the robotic vehicle. In some embodiments, the robotic vehicle may determine whether to stop one or more rotors of the robotic vehicle based on the probability of collision and the estimated consequences of the collision.

In some embodiments, the robotic vehicle may also determine and consider other criteria for managing the rotation of the one or more rotors of the robotic vehicle. In some embodiments, the robotic vehicle may determine one or more robotic vehicle flight parameters, and the robotic vehicle may consider the one or more flight parameters in the management of the rotation of the one or more rotors prior to the collision. For example, the robotic vehicle may determine its altitude, momentum, velocity, attitude, orientation, and other flight parameters, and consider the determined one or more flight parameters together with the classification of the detected object in determining how to manage the rotation of the one or more rotors prior to the collision. For example, if the robotic vehicle identifies the object as tree branches, and determines that damage to the tree branches from spinning rotors will be sufficiently low, and that the robotic vehicle's altitude is high enough that the robotic vehicle will be damaged by falling after stopping the rotors, the robotic vehicle may determine to not stop the rotors prior to the collision.

In some embodiments, the robotic vehicle may determine the robotic vehicle location and consider the location in determining how to manage rotation of the one or more rotors prior to the collision. For example, if the robotic vehicle determines that the robotic vehicle is over water, the robotic vehicle may determine to not stop the rotors because falling into the water will result in catastrophic damage to the robotic vehicle. As another example, if the robotic vehicle determines that the robotic vehicle is located indoors, the robotic vehicle may determine to stop the rotors because the distance of any uncontrolled descent will be relatively short while the potential damage to people and objects may be high. In some embodiments, the robotic vehicle may consider the robotic vehicle's location together with the classification of the detected object for managing the rotation of the one or more rotors In some embodiments, the robotic vehicle may determine a relative motion of the object with respect to the robotic vehicle and may consider the object's relative motion in the management of the rotation of the one or more rotors prior to the collision. In some embodiments, the robotic vehicle may consider the object's relative motion together with the classification of the detected object for managing the rotation of the one or more rotors. For example, if the robotic vehicle determines that the object is an animal (e.g., a dog) and that the animal is moving directly toward the robotic vehicle (e.g., is chasing the robotic vehicle), the robotic vehicle may stop the rotors to avoid injuring the animal.

In some embodiments, the robotic vehicle may determine a severity of the imminent collision and may consider the collision's severity in managing the rotation of the one or more rotors prior to the collision. In some embodiments, the determination of the collision's severity may be based on one or more other determinations, for example, one or more robotic vehicle flight parameters, the robotic vehicle's location, the relative motion of the object with respect to the robotic vehicle, as well as the classification of the detected object.

Various embodiments may be implemented within a robotic vehicle operating within a variety of communication systems 100, an example of which is illustrated in FIG. 1. With reference to FIG. 1, the communication system 100 may include a robotic vehicle 102, a base station 104, an access point 106, a communication network 108, and a network element 110.

The base station 104 and the access point 106 may provide wireless communications to access the communication network 108 over a wired and/or wireless communication backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The robotic vehicle 102 may communicate with the base station 104 over a wireless communication link 112 and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The robotic vehicle 102 and the network element 110 may communicate via the communication network 108. The network element 110 may provide the robotic vehicle 102 with a variety of information, such as navigation information, weather information, information about environmental conditions, movement control instructions, and other information, instructions, or commands relevant to operations of the robotic vehicle 102.

Figure 2:
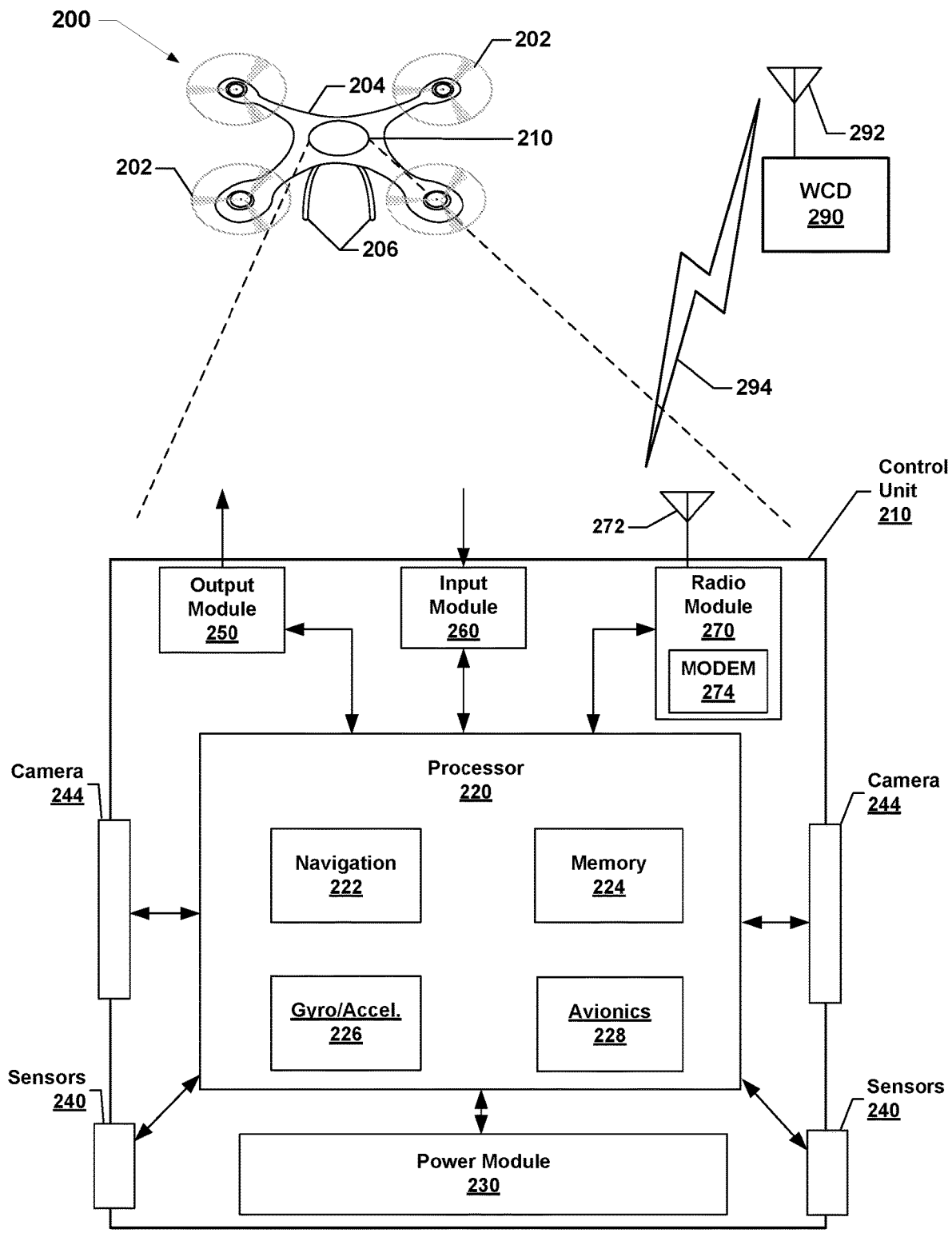
FIG. 2 is a component block diagram illustrating components of a robotic vehicle according to various embodiments.

In various embodiments, the robotic vehicle 102 may encounter an object while in flight. Examples of objects that could be encountered may include a person 120, an animal 122, a natural object such as tree 124, a structural object such as a wall 126, and the like. In some situations, a collision with an object may be unavoidable. For example, the robotic vehicle may detect the tree 124 or the wall 126 too late to avoid it, the person 120 or the animal 122 may suddenly enter the robotic vehicle's flight path, or wind, weather, or other environmental conditions may cause a collision with an object. As further described below, various embodiments enable the robotic vehicle 102 to identify the object and to dynamically manage the rotation of one or more rotors of the robotic vehicle prior to collision with the object.

robotic vehicles may include winged or rotorcraft varieties. FIG. 2 illustrates an example robotic vehicle 200 of a rotary propulsion design that utilizes one or more rotors 202 driven by corresponding motors to provide lift-off (or take-off) as well as other aerial movements (e.g., forward progression, ascension, descending, lateral movements, tilting, rotating, etc.). The robotic vehicle 200 is illustrated as an example of a robotic vehicle that may utilize various embodiments, but is not intended to imply or require that various embodiments are limited to rotorcraft robotic vehicles. Various embodiments may be used with winged robotic vehicles as well. Further, various embodiments may equally be used with land-based autonomous vehicles, water-borne autonomous vehicles, and space-based autonomous vehicles.

With reference to FIGS. 1 and 2, the robotic vehicle 200 may be similar to the robotic vehicle 102. The robotic vehicle 200 may include a number of rotors 202, a frame 204, and landing columns 206 or skids. The frame 204 may provide structural support for the motors associated with the rotors 202. The landing columns 206 may support the maximum load weight for the combination of the components of the robotic vehicle 200 and, in some cases, a payload. For ease of description and illustration, some detailed aspects of the robotic vehicle 200 are omitted such as wiring, frame structure interconnects, or other features that would be known to one of skill in the art. For example, while the robotic vehicle 200 is shown and described as having a frame 204 having a number of support members or frame structures, the robotic vehicle 200 may be constructed using a molded frame in which support is obtained through the molded structure. While the illustrated robotic vehicle 200 has four rotors 202, this is merely exemplary and various embodiments may include more or fewer than four rotors 202.

The robotic vehicle 200 may further include a control unit 210 that may house various circuits and devices used to power and control the operation of the robotic vehicle 200. The control unit 210 may include a processor 220, a power module 230, sensors 240, one or more cameras 244, an output module 250, an input module 260, and a radio module 270.

The processor 220 may be configured with processor-executable instructions to control travel and other operations of the robotic vehicle 200, including operations of various embodiments. The processor 220 may include or be coupled to a navigation unit 222, a memory 224, a gyro/accelerometer unit 226, and an avionics module 228. The processor 220 and/or the navigation unit 222 may be configured to communicate with a server through a wireless connection (e.g., a cellular data network) to receive data useful in navigation, provide real-time position reports, and assess data.

The avionics module 228 may be coupled to the processor 220 and/or the navigation unit 222, and may be configured to provide travel control-related information such as altitude, attitude, airspeed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the robotic vehicle 200 that may be used in navigation and positioning calculations, as well as providing data used in various embodiments for processing images.

The processor 220 may further receive additional information from the sensors 240, such as an image sensor or optical sensor (e.g., capable of sensing visible light, infrared, ultraviolet, and/or other wavelengths of light). The sensors 240 may also include a radio frequency (RF) sensor, a barometer, a humidity sensor, a sonar emitter/detector, a radar emitter/detector, a microphone or another acoustic sensor, a lidar sensor, a time-of-flight (TOF) 3-D camera, or another sensor that may provide information usable by the processor 220 for movement operations, navigation and positioning calculations, and determining environmental conditions. The sensors 240 may also include one or more sensors configured to detect temperatures generated by one or more robotic vehicle components, such as thermometers, thermistors, thermocouples, positive temperature coefficient sensors, and other sensor components.

The power module 230 may include one or more batteries that may provide power to various components, including the processor 220, the sensors 240, the one or more cameras 244, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The avionics module 228 and processor 220 may maneuver the robotic vehicle 200 by controlling the rotation rates of the individual motors driving the rotors 202. The processor 220 may receive data from the navigation unit 222 and use such data in order to determine the present position and orientation of the robotic vehicle 200, as well as the appropriate course towards the destination or intermediate sites. In various embodiments, the navigation unit 222 may include a GNSS receiver system (e.g., one or more global positioning system (GPS) receivers) enabling the robotic vehicle 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic vehicles, etc.

The radio module 270 may be configured to receive navigation signals, such as signals from aviation navigation facilities, etc., and provide such signals to the processor 220 and/or the navigation unit 222 to assist in robotic vehicle navigation. In various embodiments, the navigation unit 222 may use signals received from recognizable RF emitters (e.g., AM/FM radio stations, Wi-Fi access points, and cellular network base stations) on the ground.

The navigation unit 222 may include a planning application that may perform calculations to plan a path of motion for the robotic vehicle within a volumetric space ("path planning"). In some embodiments, the planning application may perform path planning using information including information about aspects of a task to be performed by the robotic vehicle, environmental condition information, an amount of heat that may be generated by one or more components of the robotic vehicle in performing the task, as well as one or more thermal constraints.

The navigation unit 222 may include collision decision logic (e.g., a collision decision application) that may detect an object posing an imminent risk of collision with robotic vehicle, and may determine a classification of the detected object. In some embodiments, the collision decision logic may be configured to identify the detected object. In some embodiments, the collision decision logic may be configured to determine a classification of the detected object. The collision decision logic may be configured to manage a rotation of one or more rotors of the robotic vehicle prior to the collision based on the identification or classification of the detected object.

The radio module 270 may include a modem 274 and a transmit/receive antenna 272. The radio module 270 may be configured to conduct wireless communications with a variety of wireless communication devices (e.g., a wireless communication device (WCD) 290). Examples of wireless communication devices with which the radio module 270 may communicate include wireless telephony base stations or cell towers (e.g., the base station 104), network access points (e.g., the access point 106), beacons, smartphones, tablets, or other computing devices. The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a robotic vehicle operator, a third-party service (e.g., package delivery, billing, etc.), or a site communication access point. The robotic vehicle 200 may communicate with a server through one or more intermediate communication links, such as a wireless telephony network that is coupled to a wide area network (e.g., the Internet) or other communication devices. In some embodiments, the robotic vehicle 200 may include and employ other forms of radio communication, such as mesh connections with other robotic vehicles or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera 244 or sensor, or may receive electronic signals from other components (e.g., a payload).

While various components of the control unit 210 are illustrated as separate components, some or all of the components (e.g., the processor 220, the output module 250, the radio module 270, and other units) may be integrated together in a single device or module, such as a system-on-chip module.

Figure 3:
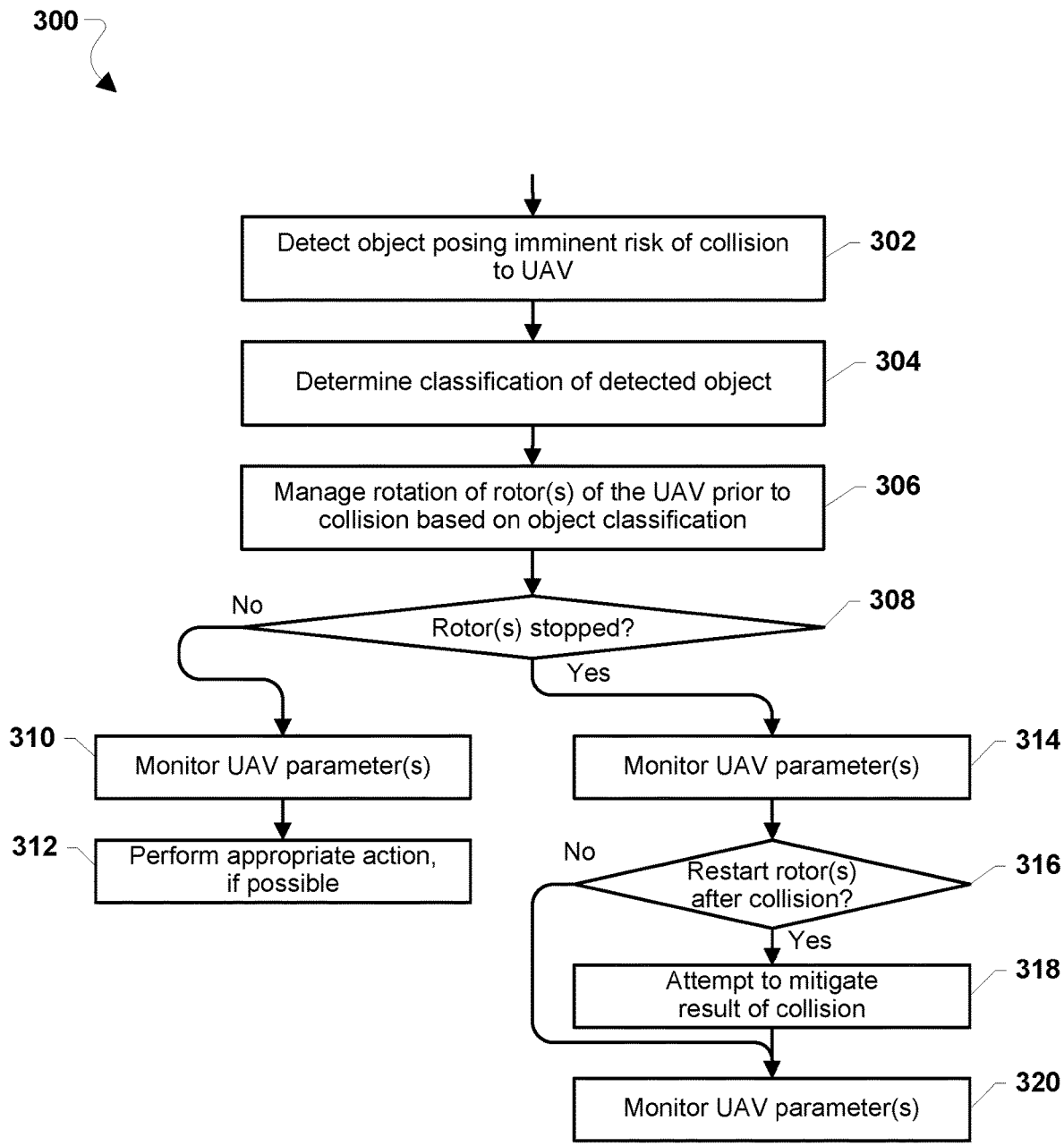
FIG. 3 is a process flow diagram illustrating a method of operating a robotic vehicle according to various embodiments.

FIG. 3 illustrates a method 300 of operating a robotic vehicle (e.g., 102, 200 in FIGS. 1 and 2) according to various embodiments. With reference to FIGS. 1-3, the method 300 may be implemented in hardware components and/or software components of the robotic vehicle, the operation of which may be controlled by one or more processors (e.g., the processor 220 and/or the like) of the robotic vehicle.

In block 302, the processor of the robotic vehicle may detect an object posing an imminent risk of collision with the robotic vehicle. For example, the processor may receive information from one or more sensors of the robotic vehicle (e.g., the sensors 240), and based on the information from the one or more sensors the processor of the robotic vehicle may detect the object.

In some embodiments, the processor of the robotic vehicle may determine a relative position of the object, a relative motion of the object, and/or a range to the object. In some embodiments, the robotic vehicle processor may determine whether a collision with the object is imminent based on the relative position of the object, the relative motion of the object with respect to the robotic vehicle, and/or the range to the object. In some embodiments, the processor may determine a relative motion of the object. In some embodiments, the processor may determine a relative motion of the object with respect to the robotic vehicle and may consider the object's relative motion in the management of the rotation of the one or more rotors prior to the collision. For example, the processor may determine whether the object is in the center or an edge of the robotic vehicle's flight path. As another example, the processor may determine whether the object is in motion into or out of the robotic vehicle's flight path. In some embodiments, the relative motion may include a relative velocity of the object in the robotic vehicle.

In block 304, the processor may determine a classification of the detected object. For example, the processor may use information from the one or more robotic vehicle sensors to determine the classification of the detected object. In some embodiments, the processor may determine a specific identification of the object (e.g., a person, an animal, a tree, a wall, a glass window, etc.). In some embodiments, the processor may apply a machine learning process, such as a machine learning classifier, to determine the classification of the detected object. In some embodiments, the processor may assign the identified object to an object class. For example, a first class of objects may include human beings, and a second class of objects may include objects that are not human beings. As another example, a first class of objects may include objects that may be easily damaged by a rotor of the robotic vehicle, such as a human being, an animal, or certain types of property, and a second class of objects may include objects that may not be easily damaged by a rotor of the robotic vehicle, such as trees, buildings, walls, glass windows, and the like.

In block 306, the processor may manage a rotation of one or more rotors of the robotic vehicle (e.g., determining whether to stop or not stop the rotor(s)) based on the classification of the object prior to the collision with the object. In some embodiments, based on the classification of the object the processor may stop the rotation of the one or more rotors to mitigate damage that may be caused by spinning rotors to the object. In some embodiments, based on the classification of the object the processor may not stop the rotation of the one or more rotors. For example, based on the classification, the processor may determine that the potential damage to the object from spinning rotors in a collision will be less than the potential damage to the robotic vehicle, either from the collision or after the collision from an uncontrolled fall, and in response not stop the rotors.

In determination block 308, the processor of the robotic vehicle may determine whether the rotors have stopped. In response to determining that the rotors have not been stopped (i.e., determination block 308="No"), the robotic vehicle processor may monitor one or more robotic vehicle parameters in block 310. For example, the robotic vehicle processor may monitor the one or more robotic vehicle parameters during and after the collision with the object, to enable the robotic vehicle processor to identify any damage to the robotic vehicle, in a change in its flight capabilities, and the like.

In block 312, the processor of the robotic vehicle may perform an appropriate action if possible. For example, based on the monitored robotic vehicle parameters, the robotic vehicle processor may determine that the robotic vehicle is capable of maneuvering to a base, a charging station, or another destination, and the robotic vehicle processor may determine a route to, and navigate to, such location. As another example, based on the monitored robotic vehicle parameters, the robotic vehicle processor may determine that the robotic vehicle is damaged and should land, and the robotic vehicle processor may perform a landing sequence. Other examples of appropriate actions are also possible.

In response to determining that the rotors have been stopped (i.e., determination block 308="Yes"), the robotic vehicle processor may monitor one or more robotic vehicle parameters in block 314. For example, the robotic vehicle processor may monitor the one or more robotic vehicle parameters during and after the collision with the object to enable the robotic vehicle processor to identify any damage to the robotic vehicle, a change in its flight capabilities, and the like.

In determination block 316, the processor of the robotic vehicle may determine whether to restart the one or more rotors after the collision. For example, the robotic vehicle processor may determine that after the collision the robotic vehicle remains at a sufficient altitude that restarting the rotors may provide flight control to enable the robotic vehicle to slow or stop its descent. As another example, the robotic vehicle processor may determine that the robotic vehicle's altitude is sufficiently low that restarting the rotors may make little or no difference. As another example, the robotic vehicle processor may determine based on the robotic vehicle parameters that the one or more stopped rotors are still functional, and based on such determination the robotic vehicle may restart the one or more rotors.

In response to determining to restart the one or more rotors after the collision (i.e., determination block 316="Yes"), the robotic vehicle processor may attempt to mitigate damage resulting from the collision in block 318. For example, the robotic vehicle processor may use such flight control that is provided by the restarted one or more rotors to attempt to mitigate the robotic vehicles navigation and/or descent.

After attempting to mitigate the result of the collision in block 318, or in response to determining not to restart the one or more rotors after the collision (i.e., determination block 316="No"), the robotic vehicle processor may monitor one or more robotic vehicle parameters to determine any results from the collision with the object in block 320.

Figure 4:
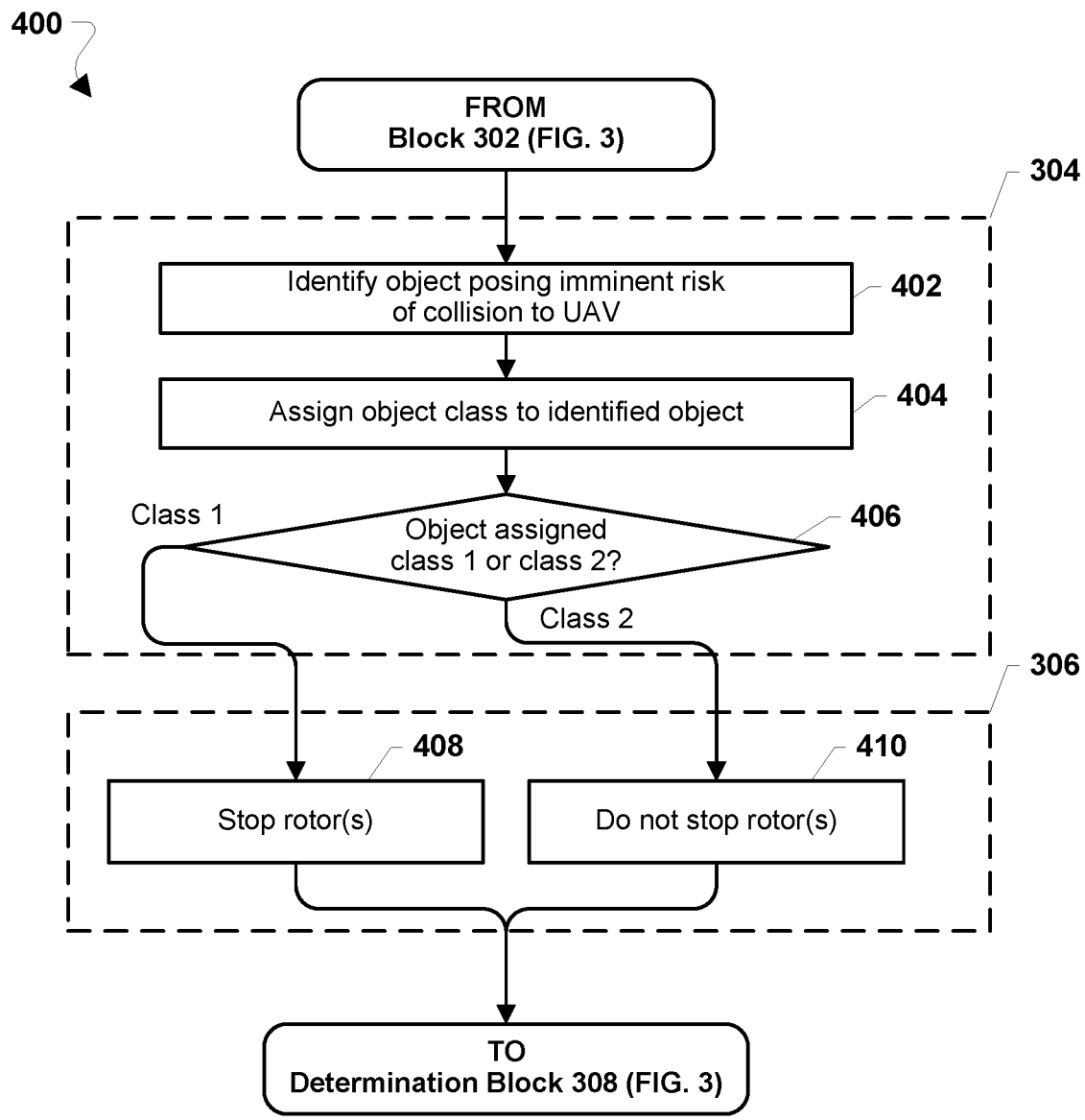
FIG. 4 is a process flow diagram illustrating a method of operating a robotic vehicle according to various embodiments

FIG. 4 illustrates a method 400 of operating a robotic vehicle (e.g., 102, 200 in FIGS. 1 and 2) according to various embodiments. With reference to FIGS. 1-4, the method 400 illustrates operations that may be performed as part of blocks 304 and 306 (FIG. 3). The method 400 may be implemented in hardware components and/or software components of the robotic vehicle, the operation of which may be controlled by one or more processors (e.g., the processor 220 and/or the like) of the robotic vehicle.

In block 402, the processor of the robotic vehicle may identify the object posing an imminent risk of collision with the robotic vehicle. In some embodiments, the processor may use information from one or more sensors of the robotic vehicle to identify the object. In some embodiments, the processor may apply a classifier model, for example, of a machine learning classification system, to identify the object.

In block 404, the processor may assign an object class to the identified object. In some embodiments, the processor may determine a classification of the identified object. In some embodiments, the processor may apply a machine learning process, such as a machine learning classifier, to determine the classification of the detected object. For example, the processor may assign the object to one of a plurality of classes. In some embodiments, the processor may determine or estimate a "cost" or consequence of damage (e.g., a level, degree, severity, extent and/or financial impact of damage) to the object that may be caused by the collision with the robotic vehicle. In some embodiments, the robotic vehicle processor may assign the class based on the determined consequence (e.g., injury and/or "cost") of damage to the object that may be caused by the collision with the robotic vehicle. In some embodiments, the class may indicate a level of priority of the object. For example, a first class of objects may include objects that may be easily damaged by a rotor of the robotic vehicle (or higher priority objects), such as a human being, an animal, or certain types of property, and a second class of objects may include objects that may not be easily damaged by a rotor of the robotic vehicle (or lower priority objects), such as trees, buildings, walls, glass windows, and the like. As another example, a first class of objects may include human beings, and a second class of objects may include objects that are not human beings. Other levels or degrees of classification are also possible.

In determination block 406, the processor may determine whether the object has been assigned to a first class or a second class.

In response to determining that the object has been assigned to the first class (i.e., determination block 406="Class 1"), the processor may stop one or more rotors of the robotic vehicle in block 408.

In response to determining that the object has been assigned to the second class (i.e., determination block 406="Class 2"), the processor may determine not to stop the one or more rotors of the robotic vehicle in block 410.

Following the operations of blocks 408 and 410, the processor may perform the operations of determination block 308.

Figure 5:
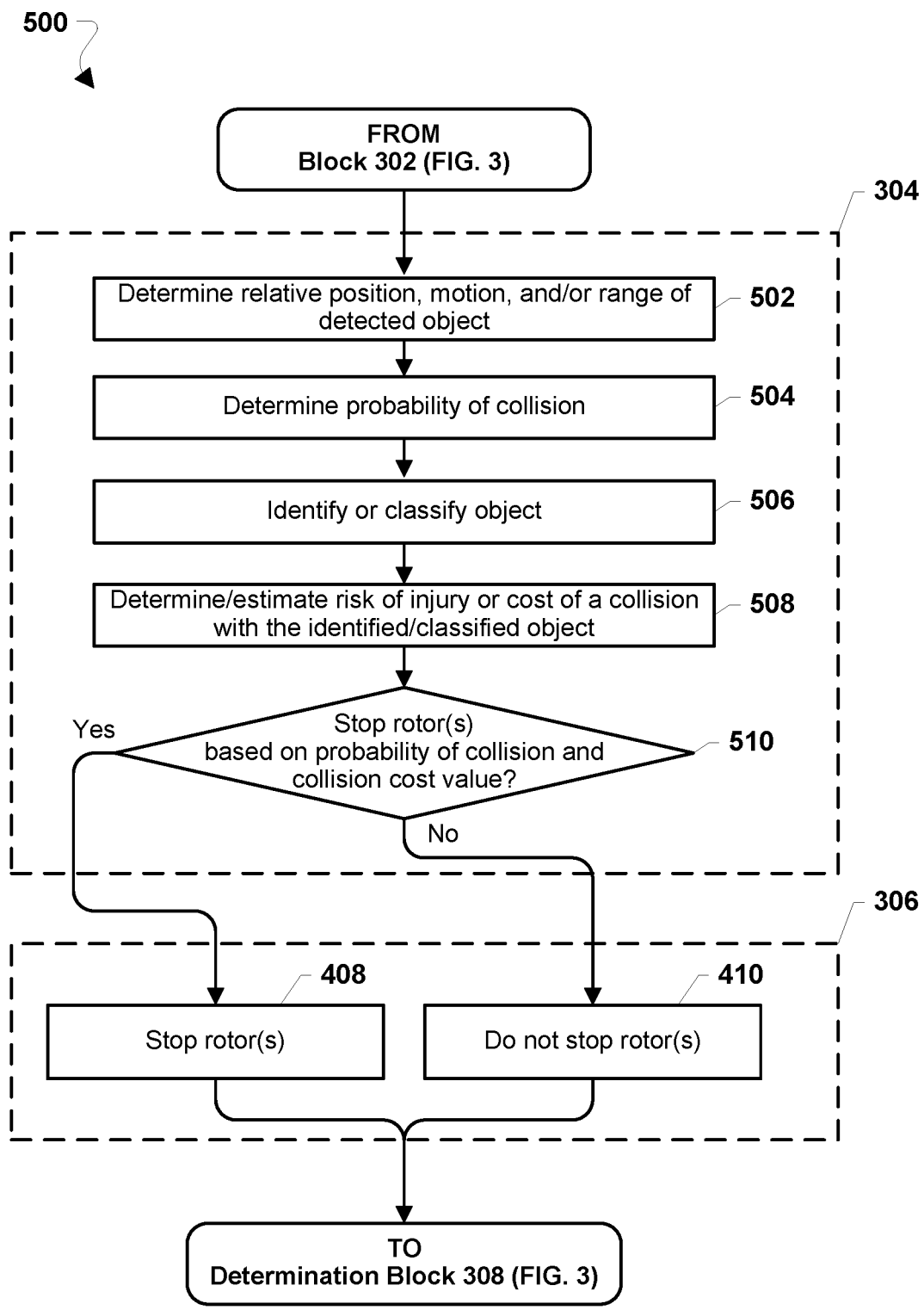
FIG. 5 is a process flow diagram illustrating a method of operating a robotic vehicle according to various embodiments

FIG. 5 illustrates a method 500 of operating a robotic vehicle according to various embodiments. With reference to FIGS. 1-5, the method 500 illustrates operations that may be performed by a robotic vehicle (e.g., 102, 200) as part of blocks 304 and 306 of the method 300. The method 500 may be implemented in hardware components and/or software components of the robotic vehicle, the operation of which may be controlled by one or more processors (e.g., the processor 220 and/or the like) of the robotic vehicle.

In block 502, the processor of the robotic vehicle may determine a relative position of the object, a relative motion of the object, and/or a range to the object. In some embodiments, the relative motion of the object may include a motion of the robotic vehicle and a motion of the object. In some embodiments, the relative motion of the object may be influenced by environmental conditions such as wind and weather. The robotic vehicle processor may use information from one or more sensors (e.g., cameras, radar, LIDAR, etc.) of the robotic vehicle to determine the relative position, relative motion, and/or range of the object.

In block 504, the robotic vehicle processor may determine a probability (i.e., likelihood or chance) of collision between the robotic vehicle and the detected object. For example, the robotic vehicle may detect a distant stationary object toward which the robotic vehicle is moving at sufficient speed, such that the probability of collision is high. In some embodiments, the robotic vehicle processor may calculate a probability or percentage probability of collision based on the relative position of the object, the relative motion of the object, and the range to the object. In some embodiments, the robotic vehicle processor may compare the calculated collision probability to one or more thresholds or acceptable likelihoods of collision.

In block 506, the processor of the robotic vehicle may identify or classify the object. In some embodiments, the processor may determine a specific identification of the object (e.g., a person, an animal, a tree, a wall, a glass window, etc.). In some embodiments, the processor may apply a machine learning model to determine a classification (e.g., animate vs. inanimate) of the detected object.

In block 508, the processor of the robotic vehicle may use the determined identity or classification of the object to determine or estimate a consequence of a collision in terms of potential for injury to persons or animals or financial implications or cost of damaging an inanimate object. In some embodiments, estimating the consequences of a collision may include a range or continuum of determinations of the potential for injury or damage that the robotic vehicle may cause to the object by a collision. In some embodiments, the collision cost value may represent potential injury or damage to the robotic vehicle that may be caused by the collision. In some embodiments, the determined consequences of a collision may be a combination of potential injury or damage to the object and the robotic vehicle. For example, the robotic vehicle processor may calculate a potential for injury in a collision with a person that may be unacceptable if the rotors are spinning. As another example, the robotic vehicle processor may calculate a potential for injury in a collision with an animal, but assign a lower cost or consequence than the same collision with a person. As another example, the robotic vehicle processor may calculate a consequence a collision with a tree, hedge, plant, etc. with rotors rotating that is acceptable. As another example, the robotic vehicle processor may estimate the financial consequences of a collision with a solid inanimate object, such as a wall, window, etc. In some cases, the financial consequences of a collision with a solid inanimate object will be the damage caused to the robotic vehicle, particularly if the object (or object class) is unlikely to be damaged by the collision. In some embodiments, the determined or estimated consequences (injuries or cost of damage) of a collision may lie on a continuum or range of consequences.

In determination block 510, the processor the robotic vehicle may determine whether to stop one or more rotors of the robotic vehicle based on the probability of collision and the determined or estimated consequences (injuries or cost of damage) of a collision. In some embodiments, the robotic vehicle processor may calculate a stop rotor score based on the probability of collision and the consequences of the collision. In such embodiments, the robotic vehicle processor may determine whether to stop the rotors based on the calculated stop rotor score. For example, the robotic vehicle processor may determine that there is a 10% probability of a collision with an object, and that the object is a person for which the consequences of injury is very high. The robotic vehicle processor may calculate a stop rotor score based on the 10% probability of the collision and the very high consequence or cost of a collision. In such case, the robotic vehicle processor may determine to stop one or more rotors to reduce the consequences of the injury by reducing injuries to a person from spinning rotors. As another example, the robotic vehicle processor may determine a 10% probability of a collision with a bird, but because the consequence of injuring a bird is relatively low, the robotic vehicle processor may calculate a low stop rotor score, and based on that determine to not stop the one or more rotors before the collision.

As another example, if the robotic vehicle processor determines a relatively high (e.g., 90%) probability of a collision with an inanimate object, such as a wall or a tree branch, but determines that the risk or consequence of damaging the object is relatively low, the processor may calculate a low stop rotor score. The robotic vehicle processor may also determine the damage that could may be done to the robotic vehicle from an uncontrolled fall and factor the risk of damage to the robotic vehicle into the determination of the consequences of a collision. For example, the robotic vehicle processor may determine not to stop the rotors before a collision if there is a high risk of damage to the robotic vehicle (e.g., from an uncontrolled fall, from a fall into water, etc.) and a low risk of damage (e.g., a low cost of damages that might be caused to the object).

In response to determining to stop the one or more rotors (i.e., determination block 510="Yes"), the processor the robotic vehicle may perform the operations of block 408 of the method 400 as described.

In response to determining not to stop the one or more rotors (i.e., determination block 510="No"), the processor the robotic vehicle may perform the operations of block 410 of the method 400 as described.

Figure 6:
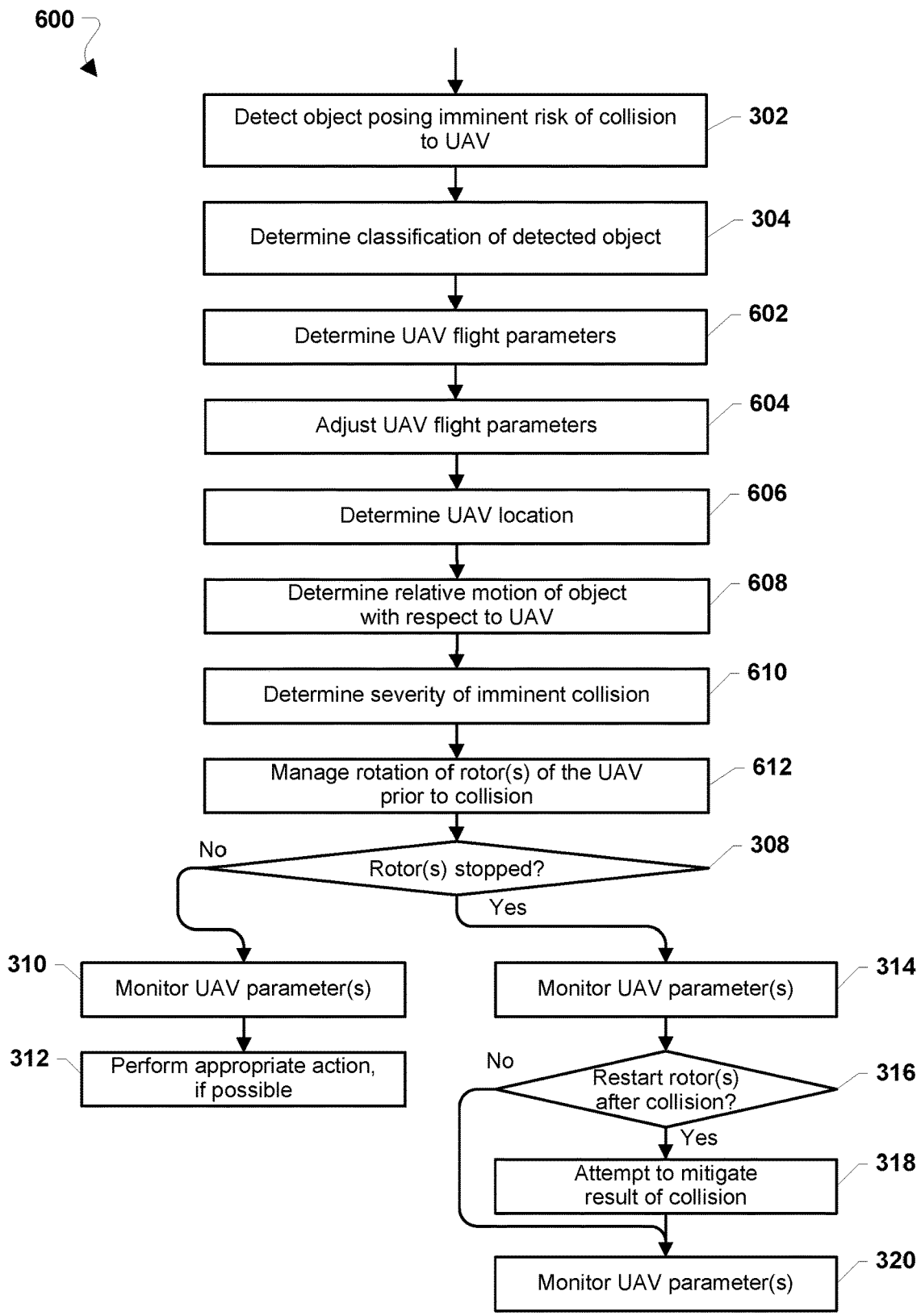
FIG. 6 is a process flow diagram illustrating a method of operating a robotic vehicle according to various embodiments

FIG. 6 illustrates a method 600 of operating a robotic vehicle (e.g., 102, 200 in FIGS. 1 and 2), according to various embodiments. The method 600 illustrates additional criteria that the processor of the robotic vehicle may consider when managing the rotation of one or more rotors of the robotic vehicle prior to a collision. With reference to FIGS. 1-6, the method 600 may be implemented in hardware components and/or software components of the robotic vehicle, the operation of which may be controlled by one or more processors (e.g., the processor 220 and/or the like) of the robotic vehicle. In blocks 302-320, the processor of the robotic vehicle may perform operations of like numbered blocks of the method 300 as described.

In block 602, the processor may determine one or more robotic vehicle flight parameters. For example, the processor may determine an altitude, momentum, velocity, attitude, orientation, and other such flight parameters of the robotic vehicle. In some embodiments, the processor may determine the one or more robotic vehicle flight parameters, and the processor may consider the one or more flight parameters in the management of the rotation of the one or more rotors prior to the collision.

In block 604, the processor may adjust one or more robotic vehicle flight parameters. In some embodiments, the processor may adjust a flight parameter based on the classification of the object. In some embodiments, the processor may adjust (or attempt to adjust) one or more of the robotic vehicle's altitude, momentum, velocity, attitude, orientation, or another flight parameter of the robotic vehicle to avoid the collision if possible, and reduce the severity of an unavoidable collision. Such adjustments may include decreasing the robotic vehicle's velocity to reduce momentum, adjusting the attitude or orientation of the robotic vehicle (e.g., to orient rotors away from the object), and the like.

In block 606, the processor may determine a location of the robotic vehicle. In some embodiments, the processor may determine a robotic vehicle location and may consider the location in the management of the rotation of the one or more rotors prior to the collision.

In block 608, the processor may determine a relative motion of the object with respect to the robotic vehicle. In some embodiments, the processor may determine a relative motion of the object with respect to the robotic vehicle and may consider the object's relative motion in the management of the rotation of the one or more rotors prior to the collision. For example, the processor may determine whether the object is in the center or an edge of the robotic vehicle's flight path. As another example, the processor may determine whether the object is in motion into or out of the robotic vehicle's flight path. In some embodiments, the relative motion may include a relative velocity of the object in the robotic vehicle.

In block 610, the processor may determine a severity of the imminent collision with the object. In some embodiments, the determination of the collision's severity may be based on one or more other determinations, for example, one or more robotic vehicle flight parameters, the robotic vehicle's location, the relative motion of the object with respect to the robotic vehicle, as well as the classification of the detected object. In some embodiments, the processor may calculate a severity value based on one or more factors, such as those described above. In some embodiments, the processor may determine whether the calculated severity value exceeds a severity threshold.

In block 612, the processor may manage a rotation of one or more rotors of the robotic vehicle prior to the collision. In various embodiments, the processor may consider a variety of criteria in managing the rotation of the robotic vehicle rotor(s), including the identification or classification of the detected object, one or more robotic vehicle flight parameters, the robotic vehicle location, and the relative motion of the object with respect to the robotic vehicle, and or the severity of the imminent collision.

For example, the processor may consider the one or more flight parameters together with the classification of the detected object for managing the rotation of the one or more rotors. For example, the processor may determine that the robotic vehicle is above a threshold altitude (e.g., above 10-15 feet), and may not stop the rotation of the rotors based on that determination. As another example, the processor may determine that the robotic vehicle is above the threshold altitude, but the object is a brick wall, and based on that determination the processor may stop the rotation of the rotors, and may attempt to restart the rotors after the collision to attempt to mitigate any results of the collision, such as preventing the robotic vehicle from falling to the ground. As another example, the processor may identify the object as tree branches, and the processor may determine that its momentum and altitude are sufficiently high such that damage to the tree branches from spinning rotors will be sufficiently low, and the processor may not stop the rotation of the rotors.

As another example, the processor may determine that it is over water, and the processor may not stop the rotation of the rotors, since falling into the water will almost certainly result in catastrophic damage to the robotic vehicle. As another example, the processor may determine that the robotic vehicle is located indoors, and the processor may stop the rotation of the rotors, since the distance of any uncontrolled descent may be relatively short. In some embodiments, the processor may consider the robotic vehicle location together with the classification of the detected object for managing the rotation of the one or more rotors.

As another example, the processor may consider the object's relative motion together with the classification of the detected object for managing the rotation of the one or more rotors. As described, the processor may be configured to use the relative motion and range to an object, as well as the state and capability of the vehicle, to determine whether or not a collision is imminent. When the processor determines that a collision is imminent, the processor may make a determination regarding the type of colliding object, and use that determination in determining whether to stop the rotors. For example, the processor may determine that the object is an animal, and that the animal is moving directly toward the robotic vehicle. Based on such a determination, the processor may stop the rotation of the rotors to avoid injuring the animal. As another example, the processor may determine whether the object is in the flight path of the robotic vehicle, but moving at such a relative velocity that a collision would occur at a relatively low velocity (which may be determined based on comparing the relative velocity to a relative velocity threshold, for example). Based on such a determination, the processor may not stop the rotation of the rotors.

As another example, the processor may consider the severity of the imminent collision for managing the rotation of the one or more rotors. In some embodiments, the processor may consider the severity of imminent collision alone or together with the classification of the detected object in managing the rotation of the one or more rotors. In some embodiments, the processor may determine whether the calculated severity exceeds a severity threshold, and the processor may manage the rotation of the one or more rotors based on whether the calculated severity exceeds the severity threshold (alone or in combination with other factors). For example, in some embodiments, the processor may stop the rotation of the one or more rotors in response to determining that the calculated severity exceeds the severity threshold.

The processor may then perform the operations of determination block 308 of the method 300 as described.

Figure 7:
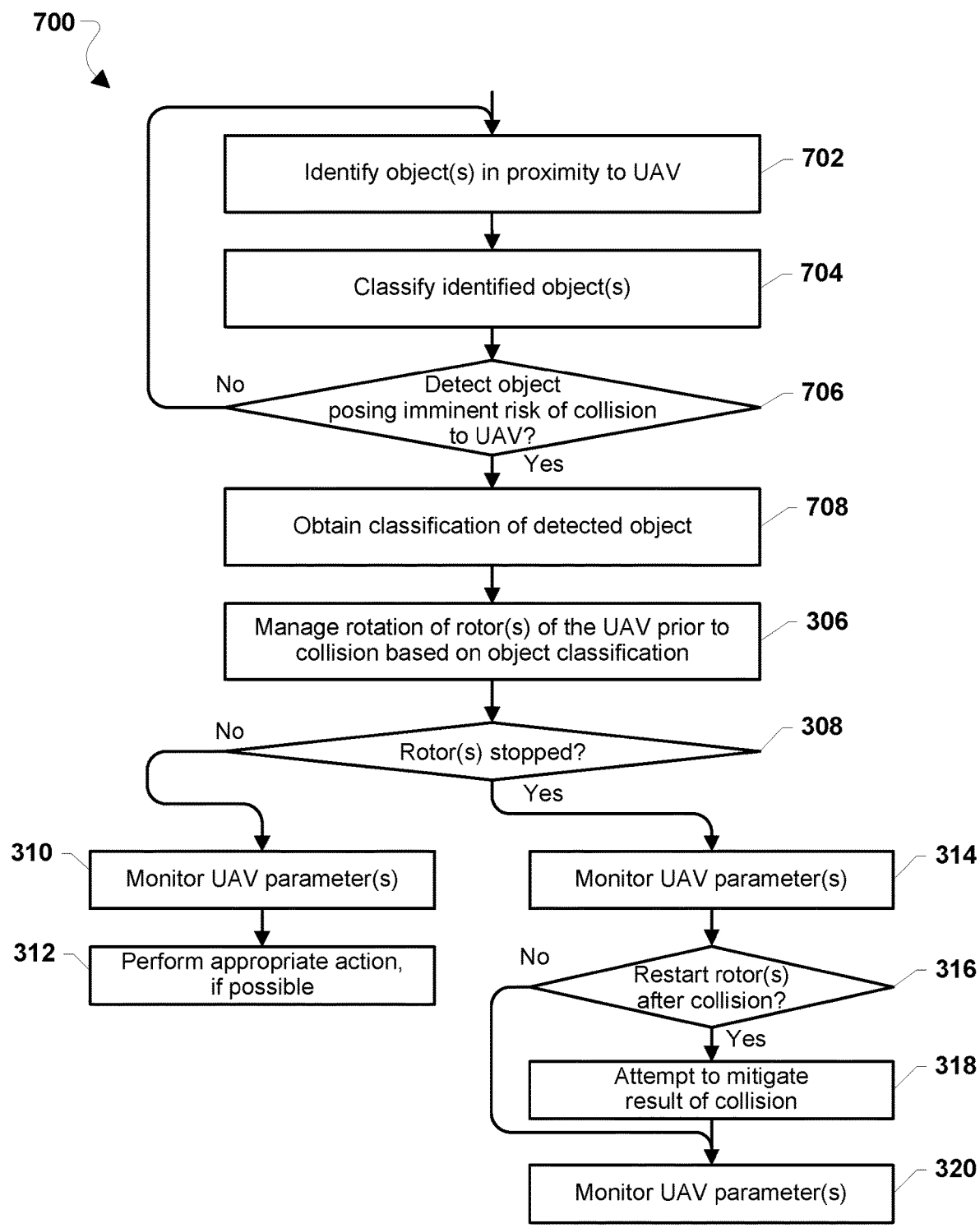
FIG. 7 is a process flow diagram illustrating a method of operating a robotic vehicle according to various embodiments.
Figure 8:
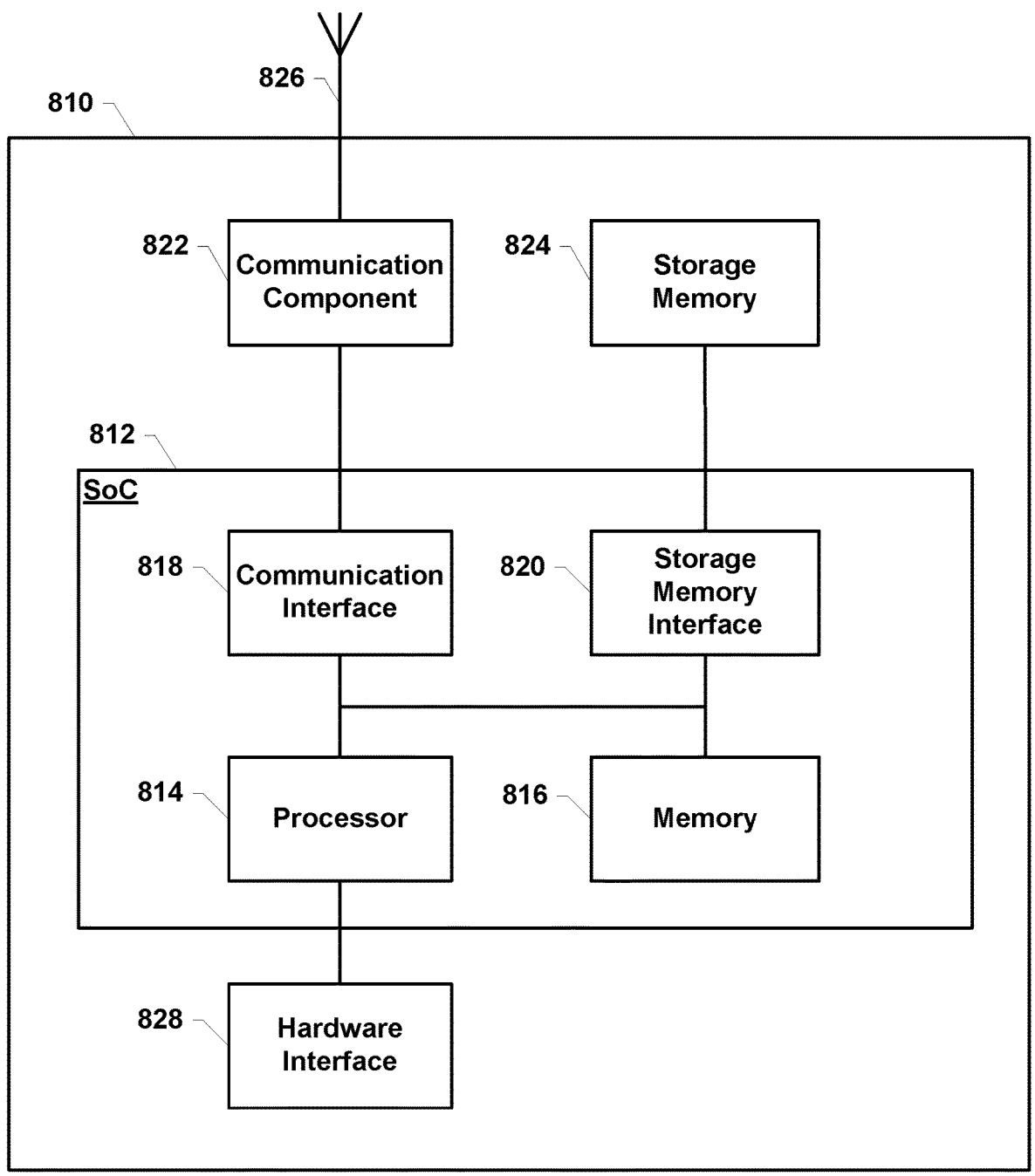
FIG. 8 is a component block diagram illustrating a processing device according to various embodiments.

FIG. 7 illustrates a method 700 of operating a robotic vehicle (e.g., 102, 200 in FIGS. 1 and 2) including identifying and classifying objects during normal operations so that such classification is available if a collision with an object is imminent according to some embodiments. With reference to FIGS. 1-7, the method 700 may be implemented in hardware components and/or software components of the robotic vehicle, the operation of which may be controlled by one or more processors (e.g., the processor 220 and/or the like) of the robotic vehicle. In blocks 308-320, the processor of the robotic vehicle may perform operations of like numbered blocks of the method 300 as described.

In block 702, the processor of the robotic vehicle may identify one or more objects in proximity to the robotic vehicle. In some embodiments, the processor of the robotic vehicle may monitor the environment around the robotic vehicle, such as by processing images obtained by one or more cameras (e.g., 244), and proactively identify objects within the images, particularly objects in proximity to or approaching the robotic vehicle. For example, the processor the robotic vehicle may detect objects that are within a defined radius of distance from the robotic vehicle. As another example, the processor may detect objects that are approaching (i.e., moving towards the robotic vehicle, in the path of the robotic vehicle, or both) or on a collision course (e.g., exhibiting a constant bearing and decreasing range) with the robotic vehicle, and thus could at some point become a threat of an imminent collision.

In some embodiments, identifying the objects in proximity to and/or moving towards the robotic vehicle may include identifying one or more characteristics of the object. In such embodiments, the processor of the robotic vehicle may associate the identified one or more characteristics with the identity of the object. The robotic vehicle processor may determine the characteristics based on information from one or more sensors of the robotic vehicle, which may include information from a camera or another image sensor or electromagnetic radiation sensor, a microphone, a temperature sensor, a motion sensor, or another robotic vehicle sensor. The one or more characteristics may include, for example, a color, a texture, or a pattern; a sound or group of sounds; a movement pattern; a heat signature; or other characteristics determinable from robotic vehicle sensor information.

In some embodiments, the robotic vehicle processor may use the one or more characteristics of the object for tracking the object and/or recognizing the object with minimum processing when there is a threat of an imminent collision with the object. In other words, by identifying a characteristic of the object that can be tracked with minimum processing, that characteristic may be used by the processor to recognize the object (and thus its classification determined in block 704) with only a few processing steps when the time before a collision is short (e.g., on the order of milliseconds to a second). For example, the robotic vehicle processor may detect an object in proximity to the robotic vehicle, and may identify the object as a child. Additionally, the robotic vehicle processor may identify one or more characteristics of the child, such as a color or pattern of the child's clothing. As another example, the robotic vehicle processor may identify a detected object as a typical pet animal (e.g., a dog), and the robotic vehicle processor may identify one or more characteristics such as a pattern of the animal's coat or another aspect of the animal's appearance. As another example, the robotic vehicle processor may identify a detected object as an inanimate object (such as a lamppost or a telephone pole), and the robotic vehicle processor may identify one or more characteristics of the inanimate object such as a pattern, texture, color, and the like.

In block 704, the processor of the robotic vehicle may classify the one or more objects detected in block 702 (e.g., the object(s) in proximity to or approaching the robotic vehicle) and store the classification in memory. For example, the processor may use object recognition processing (e.g., image recognition algorithms) of information from the one or more robotic vehicle sensors (e.g., images from cameras) to classify the detected object, and then store the classification in a data table in memory linked or associated with the one or more characteristics of the object. In some embodiments, the robotic vehicle processor may classify the object based on a specific identification of the object (e.g., a person, an animal, a tree, a wall, a glass window, etc.). In some embodiments, the processor may apply a machine learning process, such as a machine learning classifier, to determine the classification (or a most probably classification) of the detected object. In some embodiments, the processor may assign the identified object to an object class. In some embodiments, the processor using a classifier model may determine probabilities that the identified object is one or more object classes (e.g., 80% animal, 40% a dog, 20% a table, 10% the family dog, etc.).

In some embodiments, the processor may assign the object to one of a plurality of classes. In some embodiments, the processor may determine or estimate a consequence of damage (e.g., a level, degree, severity, extent and/or financial impact of damage) to the object that may be caused by the collision with the robotic vehicle, and may assign the class based on the determined or estimated consequence to the object. In some embodiments, the class may indicate a level of priority of the object, for example, indicating a higher priority for objects that may be easily damaged by a rotor of the robotic vehicle, and a relatively lower priority for objects that may not be easily damaged by a rotor of the robotic vehicle. Other levels or degrees of classification are also possible. In some embodiments, the processor may determine or estimate a consequence of damage for each of multiple object classifications, such as multiplying the consequence of damage for each object class times the probability that the object is the corresponding object class. In such embodiments, an amalgamated or combined determined or estimated consequence of collision with the object may be generated by the processor.

In determination block 706, the processor may determine whether an object posing an imminent risk of collision with the robotic vehicle is detected.

In response to determining that an object posing an imminent risk of collision with the robotic vehicle is not detected (i.e., determination block 706="No"), the robotic vehicle processor may continue to identify and classify object(s) in proximity to or approaching the robotic vehicle in blocks 702 and 704. Thus, as the robotic vehicle operates in a particular location, the processor may obtain more sensor data (e.g., camera images) of various objects and improve the classification of objects. For example, an identified object that was initially assigned a 10% probability of being the family dog may be determined by the processor to have a high probability (e.g., greater than 80%) of being the family dog as the robotic vehicle flies around or over the animal. Thus, with time, the processor's classification and determination of consequences of collision with various nearby objects may improve (exhibit higher confidence values).

In response to determining that an object posing an imminent risk of collision with the robotic vehicle is detected (i.e., determination block 706="Yes"), the robotic vehicle processor may obtain the classification of the detected object from memory in block 708. For example, the robotic vehicle processor may use the characteristic that one or more sensors was tracking to recognize the object to obtain the classification of the object from a memory of the robotic vehicle. In some embodiments, the processor may obtain both the classification of the detected object and the determined consequences of a collision from memory in block 708. In some embodiments, the processor may obtain just the determined consequences of a collision from memory in block 708.

In some embodiments, the processor may use the one or more characteristics of the previously-identified and/or classified objects to rapidly obtain the classification of the object. For example, an amount of time between detection of an object and collision with the object is typically very brief. In that brief period of time, the processor may be able to obtain a limited amount of information about the object, such as a color, a texture, a visible pattern, a sound, a movement pattern, a heat signature, or the like. In some embodiments, the processor may use such limited information (e.g., obtained from a robotic vehicle sensor just before the collision) to obtain the classification of the detected object based on the earlier classification of objects identified in proximity to the robotic vehicle. In such embodiments, even if there is insufficient time before the collision for the robotic vehicle processor to perform a full or robust object classification of the detected object, the robotic vehicle processor may classify the detected object based on previously-performed identification and/or classification of the object.

In block 306, the processor may use the object classification and or determined consequences of a collision to manage the rotation of one or more rotors prior to the collision as described. The processor may continue executing operations of blocks 308-320 of the method 300 as described.

As an example, the robotic vehicle processor may identify a nearby object that happens to be a child. The processor may also determine a characteristic of the object, for example, a pattern on the child's shirt. The processor may classify the object as a human (or even a child) such as by using facial and other feature recognition algorithms executing on images obtained by one or more robotic vehicle cameras. Having classified the object as a child, the processor may assign a high priority and/or a high consequence of a collision with the identified object, such as severity or cost of injury or damage to the identified object. The processor may save the object's classification and/or consequence of collision in memory in association with the determined characteristic (e.g., shirt pattern). Later, the processor may detect that an object poses an imminent risk of collision with the robotic vehicle and, determining that the object matches the pattern on the child's shirt, conclude that the robotic vehicle is flying towards the child. In the brief time before an imminent (and thus unavoidable) collision with the child, the robotic vehicle processor may only have time to detect the pattern on the child's shirt. However, based on the detected clothing pattern, the processor may determine the classification of or consequences of a collision with the object in a few milliseconds (e.g., by recalling this information from memory), and determine that the rotation of one or more rotors should be stopped prior to the collision with the child. Thus, the processor is able to stop the rotors before the collision, thereby sparing the child from injury from spinning rotors, even though the time between detection and collision was too short for the robotic vehicle maneuver to avoid the collision.

Various embodiments may be implemented within a processing device 810 configured to be used in a robotic vehicle. A processing device may be configured as or including a system-on-chip (SOC) 812, an example of which is illustrated FIG. 8. With reference to FIGS. 1-8, the SOC 812 may include (but is not limited to) a processor 814, a memory 816, a communication interface 818, and a storage memory interface 820. The processing device 810 or the SOC 812 may further include a communication component 822, such as a wired or wireless modem, a storage memory 824, an antenna 826 for establishing a wireless communication link, and/or the like. The processing device 810 or the SOC 812 may further include a hardware interface 828 configured to enable the processor 814 to communicate with and control various components of a robotic vehicle. The processor 814 may include any of a variety of processing devices, for example any number of processor cores.

The term "system-on-chip" (SoC) is used herein to refer to a set of interconnected electronic circuits typically, but not exclusively, including one or more processors (e.g., 814), a memory (e.g., 816), and a communication interface (e.g., 818). The SOC 812 may include a variety of different types of processors 814 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 812 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 812 may include one or more processors 814. The processing device 810 may include more than one SoC 812, thereby increasing the number of processors 814 and processor cores. The processing device 810 may also include processors 814 that are not associated with an SoC 812 (i.e., external to the SoC 812). Individual processors 814 may be multicore processors. The processors 814 may each be configured for specific purposes that may be the same as or different from other processors 814 of the processing device 810 or SOC 812. One or more of the processors 814 and processor cores of the same or different configurations may be grouped together. A group of processors 814 or processor cores may be referred to as a multi-processor cluster.

The memory 816 of the SoC 812 may be a volatile or non-volatile memory configured for storing data and processor-executable instructions for access by the processor 814. The processing device 810 and/or SoC 812 may include one or more memories 816 configured for various purposes. One or more memories 816 may include volatile memories such as random access memory (RAM) or main memory, or cache memory.

Some or all of the components of the processing device 810 and the SOC 812 may be arranged differently and/or combined while still serving the functions of the various aspects. The processing device 810 and the SOC 812 may not be limited to one of each of the components, and multiple instances of each component may be included in various configurations of the processing device 810.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 400, 500, 600, and 700 may be substituted for or combined with one or more operations of the methods 300, 400, 500, 600, and 700, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of operating a robotic vehicle, comprising:
   detecting, by a processor of the robotic vehicle, an object posing an imminent risk of unavoidable collision with the robotic vehicle;

determining, by the processor, a classification of the detected object;

managing a rotation of a rotor of the robotic vehicle prior to the unavoidable collision based on the classification of the object, wherein the managing the rotation of the rotor comprises:

stopping the rotation of the rotor upon a determination that the object is classified in a first class of objects;

determining whether to restart the rotation of the rotor after the unavoidable collision in response to stopping the rotation of the rotor prior to the unavoidable collision; and maintaining the rotation of the rotor upon a determination that the object is classified in a second class of objects.

2. The method of claim 1, wherein detecting the object posing an imminent risk of unavoidable collision with the robotic vehicle comprises:

determining one or more of a relative position, a relative motion, and a range of the detected object;

determining a probability of collision with the object based on the one or more of the relative position, the relative motion, and the range of the detected object;

determining the collision is unavoidable based on the probability of collision.

3. The method of claim 1, wherein determining the classification of the detected object comprises identifying the object.

4. The method of claim 3, further comprising determining a consequence of the unavoidable collision based on the classification of the identified object.

5. The method of claim 4, wherein managing the rotation of the rotor of the robotic vehicle prior to the unavoidable collision based on the classification of the object comprises determining whether to stop the rotor of the robotic vehicle based on the determined consequence of the unavoidable collision.

6. The method of claim 4, wherein managing the rotation of the rotor of the robotic vehicle prior to the unavoidable collision based on the classification of the object comprises determining whether to stop the rotor of the robotic vehicle based on the determined consequence of a collision and a determined probability of unavoidable collision with the object.

7. The method of claim 1, wherein the first class of objects comprises a human being, and the second class of objects comprises objects that are not human beings.

8. The method of claim 1, wherein determining the classification of the detected object comprises determining a relative motion of the object with respect to the robotic vehicle.

9. The method of claim 1, further comprising determining flight parameters of the robotic vehicle, wherein managing the rotation of the rotor of the robotic vehicle prior to the unavoidable collision based on the classification of the object comprises managing the rotation of the rotor based on the flight parameters of the robotic vehicle and the classification of the object.

10. The method of claim 1, further comprising determining a location of the robotic vehicle, wherein managing the rotation of the rotor of the robotic vehicle prior to collision based on the classification of the object comprises managing the rotation of the rotor based on the location of the robotic vehicle and the classification of the object.

11. The method of claim 1, further comprising determining a severity of an imminent collision, wherein managing the rotation of the rotor of the robotic vehicle prior to collision based on the classification of the object comprises managing the rotation of the rotor based on the determined severity of the imminent collision.

12. The method of claim 1, further comprising:

identifying, by the processor, one or more objects in proximity to or approaching the robotic vehicle and one or more characteristics of the identified one or more objects; and classifying, by the processor, the one or more objects prior to detecting the object posing an imminent risk of unavoidable collision with the robotic vehicle;

wherein determining the classification of the detected object comprises recalling a classification of the detected object accomplished prior to detecting the object posing the imminent risk of unavoidable collision with the robotic vehicle.

13. A robotic vehicle, comprising:

a rotor; and a processor coupled to the rotor and configured to:

detect an object posing an imminent risk of unavoidable collision with the robotic vehicle;

determine a classification of the detected object;

manage a rotation of the rotor prior to the unavoidable collision based on the classification of the object, wherein, to manage the rotation of the rotor, the processor is further configured to:

stop the rotation of the rotor upon a determination that the object is classified in a first class of objects;

determine whether to restart the rotation of the rotor after the unavoidable collision in response to stopping the rotation of the rotor prior to the unavoidable collision; and maintain the rotation of the rotor upon a determination that the object is classified in a second class of objects.

14. The robotic vehicle of claim 13, wherein the processor is further configured to:

determine one or more of a relative position, a relative motion, and a range of the detected object;

determine a probability of collision with the object based on the one or more of the relative position, the relative motion, and the range of the detected object;

determine the collision is unavoidable based on the probability of collision.

15. The robotic vehicle of claim 13, wherein the processor is further configured to identify the object.

16. The robotic vehicle of claim 15, wherein the processor is further configured to:

determine a consequence of the unavoidable collision based on the classification of the identified object.

17. The robotic vehicle of claim 16, wherein the processor is further configured to:

determine whether to stop the rotor prior to the unavoidable collision based on the determined consequence of the unavoidable collision.

18. The robotic vehicle of claim 16, wherein the processor is further configured to:

determine whether to stop the rotor based on the determined consequence of the unavoidable collision and a determined probability of collision with the object.

19. The robotic vehicle of claim 13, wherein the first class of objects comprises a human being, and the second class of objects comprises objects that are not human beings.

20. The robotic vehicle of claim 13, wherein the processor is further configured to:
    determining a relative motion of the object with respect to the robotic vehicle.
21. The robotic vehicle of claim 13, wherein the processor is further configured to:
    determine flight parameters of the robotic vehicle; and
    manage the rotation of the rotor based on the flight parameters of the robotic vehicle and the classification of the object.
22. The robotic vehicle of claim 13, wherein the processor is further configured with processor-executable instructions to:
    determine a location of the robotic vehicle; and
    manage the rotation of the rotor based on the location of the robotic vehicle and the classification of the object.
23. The robotic vehicle of claim 13, wherein the processor is further configured with processor-executable instructions to:
    determine a severity of an imminent collision; and
    manage the rotation of the rotor prior to collision based on the classification of the object comprises managing the rotation of the rotor based on the determined severity of the imminent collision.
24. The robotic vehicle of claim 13, wherein the processor is further configured to:
    identify one or more objects in proximity to or approaching the robotic vehicle and one or more characteristics of the identified one or more objects;
    classify the one or more objects prior to detecting the object posing an imminent risk of unavoidable collision with the robotic vehicle; and
    determine the classification of the detected object by recalling the classification of the detected object accomplished prior to detecting the object posing the imminent risk of unavoidable collision with the robotic vehicle.
25. A robotic vehicle comprising:
    means for propulsion of the robotic vehicle;
    means for detecting an object posing an imminent risk of unavoidable collision with the robotic vehicle;
    means for determining a classification of the detected object;
    means for managing the means for propulsion of the robotic vehicle prior to the unavoidable collision based on the classification of the object, wherein the means for managing the means for propulsion comprises:
        means for stopping the means for propulsion upon a determination that the object is classified in a first class of objects;
        means for determining whether to restart the means for propulsion after the unavoidable collision in response to stopping the means for propulsion prior to the unavoidable collision; and
        means for maintaining the means for propulsion upon a determination that the object is classified in a second class of objects.
26. The robotic vehicle of claim 25, further comprising:
    means for determining one or more of a relative position, a relative motion, and a range of the detected object;
    means for determining a probability of collision with the object based on the one or more of the relative position, the relative motion, and the range of the detected object; and
    means for determining the collision is unavoidable based on the probability of collision.
27. The robotic vehicle of claim 25, further comprising means for identifying the object.
28. The robotic vehicle of claim 27, further comprising means for determining a consequence of the unavoidable collision based on the classification of the identified object.
29. The robotic vehicle of claim 28, further comprising means for determining whether to stop the means for propulsion of the robotic vehicle prior to the unavoidable collision based on the determined consequence of the unavoidable collision.
30. The robotic vehicle of claim 28, further comprising means for determining whether to stop the means for propulsion of the robotic vehicle prior to the unavoidable collision based on the determined consequence of the unavoidable collision and a determined probability of collision with the object.
31. The robotic vehicle of claim 25, wherein the first class of objects comprises a human being, and the second class of objects comprises objects that are not human beings.
32. The robotic vehicle of claim 25, further comprising means for determining a relative motion of the object with respect to the robotic vehicle.
33. The robotic vehicle of claim 25, further comprising:
    means for determining flight parameters of the robotic vehicle; and
    means for managing the means for propulsion based on the flight parameters of the robotic vehicle and the classification of the object.
34. The processing device of claim 25, further configured to:
    determine a location of the robotic vehicle; and
    manage the rotation of the rotor based on the location of the robotic vehicle and the classification of the object.
35. The processing device of claim 25, further configured to:
    determine a severity of an imminent collision; and
    manage the rotation of the rotor based on the determined severity of the imminent collision.
36. The robotic vehicle of claim 25, further comprising:
    means for identifying one or more objects in proximity to or approaching the robotic vehicle and one or more characteristics of the identified one or more objects;
    means for classifying the one or more objects prior to detecting the object posing an imminent risk of unavoidable collision with the robotic vehicle; and
    means for determining the classification of the detected object by recalling a classification of the detected object accomplished prior to detecting the object posing the imminent risk of unavoidable collision with the robotic vehicle.
37. A non-transitory computer-readable medium comprising processor-executable program code configured to cause a processor to:
    detect an object posing an imminent risk of unavoidable collision with the robotic vehicle;
    determine a classification of the detected object; and
    manage a rotation of a rotor prior to the unavoidable collision based on the classification of the object, wherein the managing the rotation of the rotor comprises:
        stopping the rotation of the rotor upon a determination that the object is classified in a first class of objects;
        determining whether to restart the rotation of the rotor after the unavoidable collision in response to stopping the rotation of the rotor prior to the unavoidable collision; and maintaining the rotation of the rotor upon a determination that the object is classified in a second class of objects.

\* \* \* \* \*